United States Patent [19]
Masseth

[11] Patent Number: 4,677,751
[45] Date of Patent: Jul. 7, 1987

[54] DEVICE AND METHOD FOR DETERMINING HOSE SIZE AND HOSE FITTING STYLE AND SIZE

[75] Inventor: David A. Masseth, Washington Township, Montgomery County, Ohio

[73] Assignee: Dayco Products, Inc., Dayton, Ohio

[21] Appl. No.: 655,815

[22] Filed: Oct. 1, 1984

[51] Int. Cl.⁴ .............................................. G01B 5/24
[52] U.S. Cl. .................................. 33/143 M; 33/532; 33/199 R; 33/178 R
[58] Field of Search ............. 33/531, 532, 529, 143 R, 33/143 M, 143 J, 199 R, 143 K, 178 R

[56] References Cited

U.S. PATENT DOCUMENTS

| | | | |
|---|---|---|---|
| 552,238 | 12/1895 | Darling | 33/199 R |
| 987,703 | 3/1911 | Curtin | 33/199 R X |
| 2,305,376 | 12/1942 | Blum | 33/143 M |
| 2,801,472 | 8/1957 | Davidiak et al. | 33/143 J |
| 2,874,475 | 2/1959 | McGaffey | |
| 2,945,301 | 7/1960 | Peterson | 33/143 M X |
| 3,041,732 | 7/1962 | Christner | 33/143 M |

OTHER PUBLICATIONS

Gates Measuring Tools, Identification Guide and Templates.
Parker–Hannifin End Fitting Size Chart.

Primary Examiner—William D. Martin, Jr.
Attorney, Agent, or Firm—Joseph V. Tassone

[57] ABSTRACT

In order to determine the size and style of a hose fitting, and the size of a hose which may be assembled thereto, a simple, easy-to-use device is provided. The device has a body, one end of which permits identification of various types of tapered, threaded fittings, the other end of which may be used to measure various dimensional features of a fitting or hose. By using viewing means on the device, measuring indicia on the device may be quickly read.

16 Claims, 11 Drawing Figures

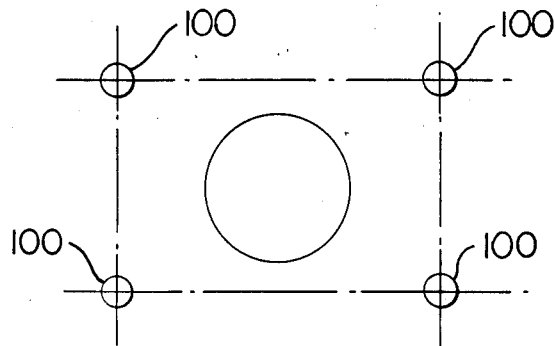
FIG.5
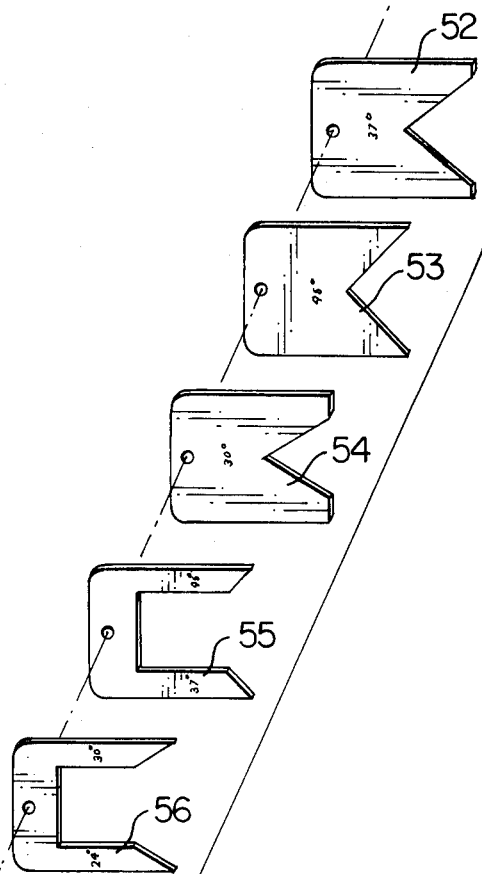
FIG.4
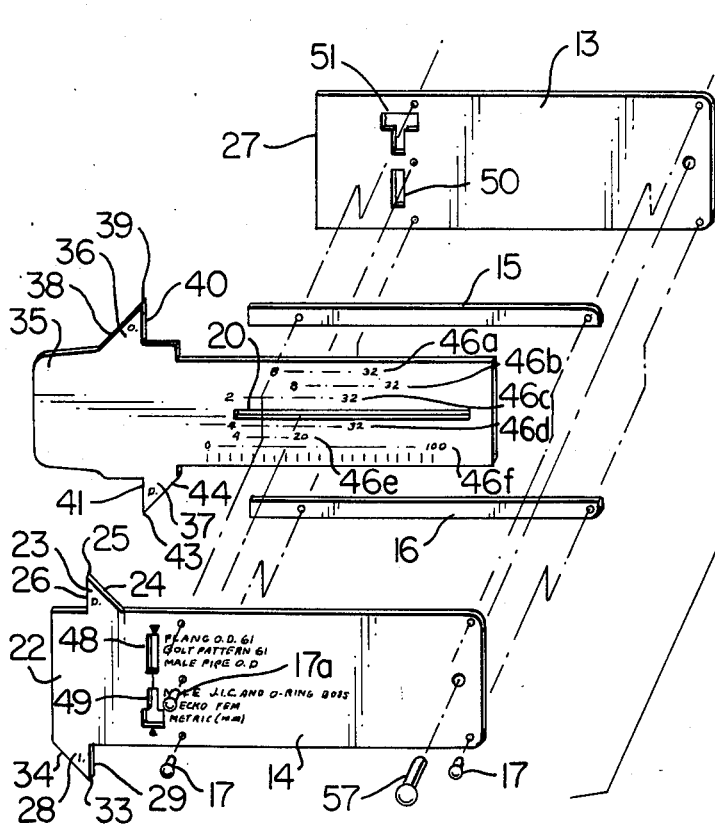

DEVICE AND METHOD FOR DETERMINING HOSE SIZE AND HOSE FITTING STYLE AND SIZE

BACKGROUND OF THE INVENTION

1. Field of the Invention

This invention relates to an improved measuring tool and a method for its use.

2. Prior Art Statement

For the transmission of fluids, particularly liquids such as those used in hydraulic systems, many styles, types and sizes of hose assemblies are required. These hose assemblies, consisting of the hose itself and attached hose couplings, adapters and other hose fittings are designed to fit a variety of purposes and needs. The assemblies comprise fittings that may be male or female and are adapted to interfit other fittings in the same system. As a result of these many designs, the fluid transmission industry has developed a large variety of fittings having different diameters, types of threads, tapered extremities, flange dimensions, flange bolt dimensions, and other features. In addition, various hose diameters are required. This situation is further complicated since some of the above are measured in the metric system and others are measured in the English system. The user of hose assemblies is frequently faced with an identification problem. The user needs tools whereby he can measure dimensions and angles and determine the type of hose fitting that is in use or that is needed; or measure the hose itself.

Until now, the only means available to make measurements and identify types has been very crude, bulky, and inconvenient. The following devices are in present use:

1. The Gates Rubber Company:
    Coupling Identification Measuring Tools.
    Thread Identification Guide.
    Templates.
    Power Link Adapters.
2. Parker-Hannifin Company:
    End Fitting Size Chart.
3. McGaffey, in U.S. Pat. No. 2,874,475, describes a pipe joint gauge.
4. Davidiak et al. in U.S. Pat. No. 2,801,472, describes a vernier gauge.

The Gates system requires the use of separate thread gauges, seat angle gauges, calipers, and identification guides. In order to identify the required features of a coupling, the user must apply these various devices to obtain measurements, then search through the guide to find the corresponding size. This is unwieldy and incomplete, since it does not permit identification of all the important features.

The Parker-Hannifin system is greatly limited in that it only provides a series of templates for measuring the nipples, and flare angles. The user must try these various templates in order to determine dimensions, then look through a guide to find the size. This is also unwieldy and incomplete.

The device described by McGaffey is particularly adapted to measure the angles on tapered, threaded fittings in which the taper extends the entire length of the fitting.

The gauge described by Davidiak et al is particularly adapted to measure the smaller diameter of an externally chamfered circular object and the larger inner diameter of an internally chambered object.

SUMMARY OF THE INVENTION

The present invention provides a device which incorporates, in one unit, a means of measuring and providing all identification necessary to determine hose fitting features, as well as a means for measuring the hose itself.

It is a feature of this invention to permit measurement and identification with a simple, inexpensive tool.

It is a further feature to apply the various portions of the tool quickly and easily so as to provide data which is easily read, thus permitting ready identification of the fitting.

The novel device consists of a body having at one end a plurality of superimposed members which serve as angle gauges to determine the correct fitting angle, thus determining the style of fitting. The other end of the body has measuring means for determining the inside (I.D.) or outside (O.D.) diameter of the fitting or the hose, as well as the diameter of the flange and the flange bolt pattern. This measuring means consists of a slidable member mounted on the body, the member and the body forming inside and outside measuring calipers. A series of indicia are printed on the slidable member, and viewing windows on the body permit these indicia to be read in order to provide the necessary identification data. The body and slidable member are operable from either side of the device (i.e., reversible) so that each side of the device can provide a different set of data.

In particular, the novel device consists of a body which includes at least two superimposed flat sheets having viewing means and means for separating the sheets therebetween secured together by fastening means, the separating means form a slot between the two sheets, one ende of the body has a plurality of superimposed members which serve as angle gauges to determine the correct fitting angle, thus determining the style of fitting. The other end of the body has measuring means for determining the inside (I.D.) or outside (O.D.) diameter of the fittting or the hose as well as the diameter of the flange. The measuring means consists of at least one portion attached to one end of one of the flat sheets and a third flat sheet slidably mounted between the two superimposed flat sheets which also has a corresponding portion of the measuring means for cooperating with the measuring means portion on the one of the two flat sheets. The third flat sheet also has indicia correlated with the relationship between the dimensions determined by the measuring means and a plurality of standard industrial identification systems whereby the hose or fitting is identified by the indicia on the third sheet in the viewing means.

The versatility of the device can be appreciated by enumerating some of the various features of hose fittings and hose which can be measured and identified:

1. Outside diameters, metric and English systems:
    a. Coupling flange, SAE codes 61 and 62
    b. Fitting bolt patterns, SAE codes 61 and 62
    c. Male pipe thread
    d. Male J.I.C. thread
    e. Male Stecko coupling
    f. Hose
    g. O-Ring Boss
2. Inside diameters, metric and English systems:
    a. Female pipe thread
    b. Female J.I.C. thread
    c. Hose 3. Angles of tapered hose fitting extremity:
   a. 30° metric, female
   b. 24° metric, female
   c. 37° J.I.C., male and female
   d. 45° S.A.E., male and female
   e. 30° J.I.S. metric, male The term "J.I.C." means Joint Industry Conference.

The term "J.I.S." means Japanese Industrial Standard.

The term "Stecko" refers to a coupling system wherein the male and female connectors are held together by a U-shaped pin or staple.

The term "S.A.E." means Society of Automotive Engineers.

The terms "O-Ring Boss" and "Flange" refer to types of fittings having special characteristics that are known in the hose and hose fitting arts.

BRIEF DESCRIPTION OF THE DRAWINGS

The preferred embodiment of the present invention is illustrated by the accompanying drawings, in which:

FIG. 4 is an exploded view of the device, illustrating the various parts thereof.

FIG. 5 illustrates a standard bolt pattern which can be measured by the device.

DESCRIPTION OF THE ILLUSTRATED EMBODIMENT

Figure 1:
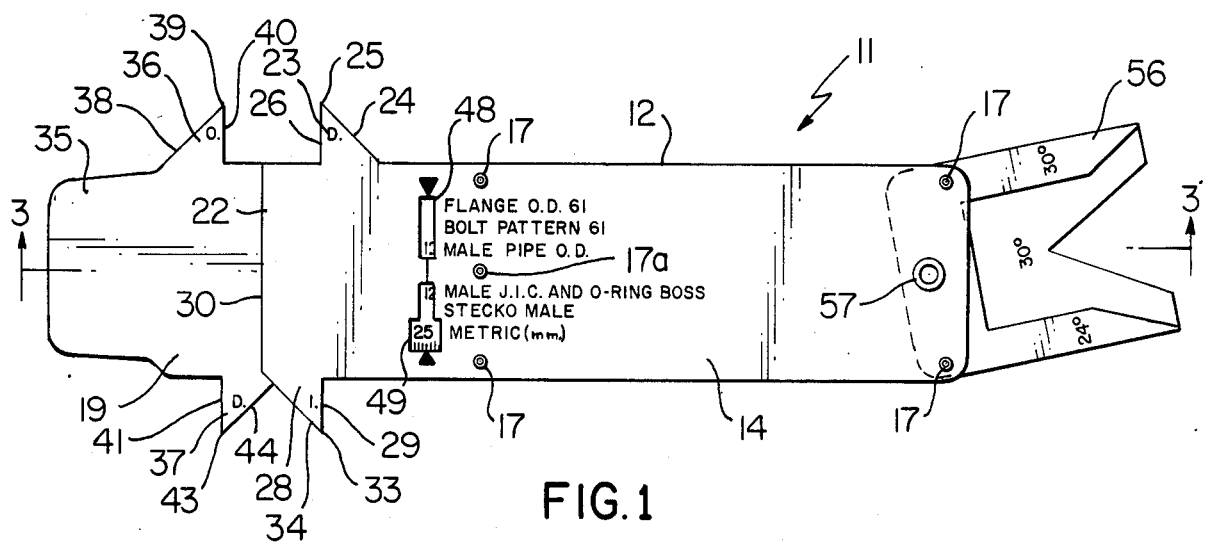
FIG. 1 is a view in elevation of one side of the novel device.

Referring to the drawings, FIGS. 1–4 depict the novel device, generally designated by reference number 11. The device principally consists of a body, designated by reference number 12, which is primarily made of two flat sheets of plastic, metal, cardboard, impregnated paper, or similar material. These sheets are designated by reference numbers 13 and 14, and are separated by thin strips 15 and 16 at the upper and lower surfaces of sheets 13 and 14, these strips being made of material similar to the material of sheets 13 and 14. The sheets and strips are secured together by means of grommets 17 at the four corners of the assembly, and a center grommet 17a, the strips thus creating an opening 18 between the center areas of the sheets.

A third flat sheet 19, made of material similar to that of sheets 13 and 14, is narrower than sheets 13 and 14, and is adapted to be slidably mounted between sheets 13 and 14 by fitting into the opening 18. The inner end of sheet 19 has a horizontal slot 20 which fits over grommet 17a, grommet 17a acting to prevent sheet 19 from being separated from body 12.

The flat sheet 14 is somewhat longer than the sheet 13, and has a different configuration at its end position 22 which is adjacent the slidably mounted sheet 19. The longer position, as viewed in FIG. 1, has an upwardly extending triangular segment 23 in which the angled surface 24 extends upwardly to the left, having an apex 25 and a vertical side 26 which is in alignment with the left hand vertical end 27 of the sheet 13, as best shown in FIG. 2. The portion 22 also has a similar downwardly extending triangular segment 28 in which the vertical side 29 is offset from the lefthand vertical end 30 and is in alignment with left hand vertical end 27 of sheet 13, terminating in apex 33 and having an angled surface 34 extending upwardly to the right to the apex 33 as seen in FIG. 2, approximately parallel to the angle of surface 24. Sides 26 and 29 are in vertical alignment.

Figure 2:
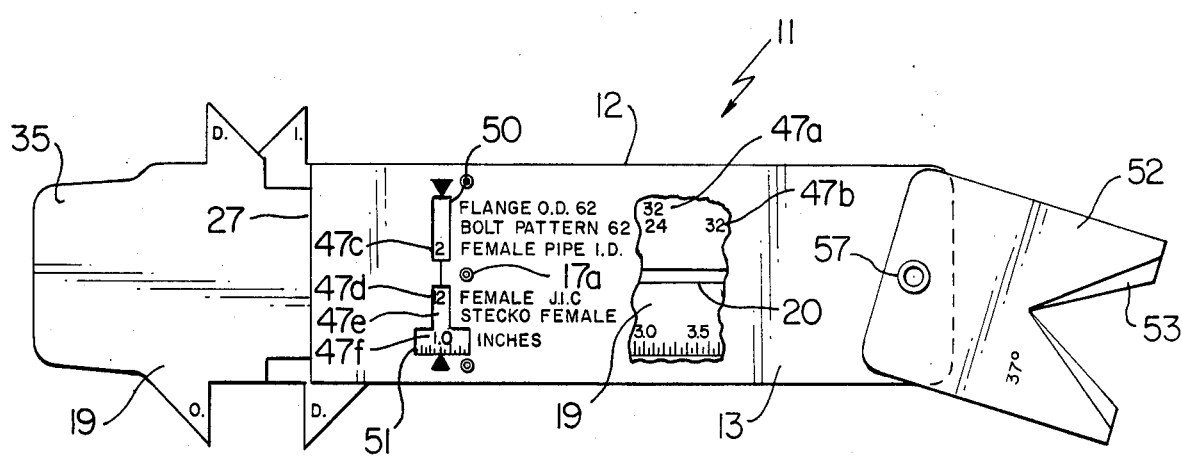
FIG. 2 is a view in elevation, partially cut away, of the other side of the novel device.
Figure 3:
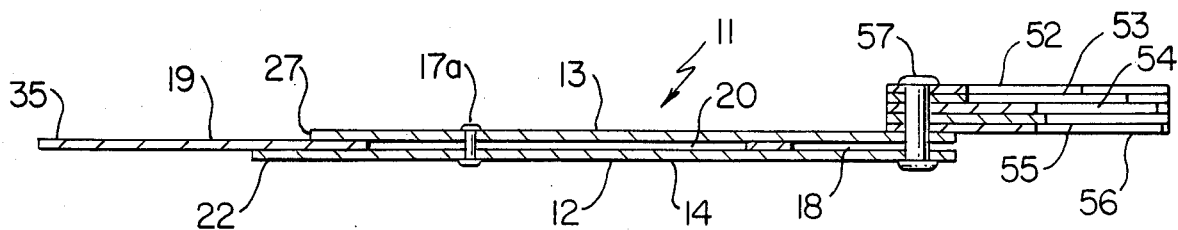
FIG. 3 is an enlarged sectional view of the novel device, illustrating the relationship of the parts comprising the device, taken along line 3—3 of FIG. 1.

As can be seen in FIG. 1, the slidable sheet 19 is generally rectangular, but the outer portion 35 also has an upwardly extending triangular segment 36 and a downwardly extending triangular segment 37, similar to segments 23 and 28. Segment 36 has an angled surface 38 extending upwardly to the right having an apex 39 and a vertical side 40. Segment 37 has a vertical side 41 offset so that the sides 41 and 40 are in vertical alignment, and terminates in apex 43, further having an angled surface 44 extending upwardly to the right from apex 43. The surfaces 38 and 44 are approximately parallel. The purpose and relationship of these segments will be described below.

As seen in FIG. 4, the slot 20 is located approximately in the center of sheet 19. Above the slot are three vertically spaced rows of indicia or markings, and below the slot are three additional rows of markings. These rows are designated by reference numbers 46a, 46b, 46c, 46d, 46e and 46f, while the reverse side of the sheet bears similar rows 47a, 47b, 47c, 47d, 47e and 47f as shown in FIG. 2. Viewing windows 48 and 49 are located on sheet 14, shown in FIG. 1, so that the rows of indicia 46a through 46f are visible when the sheet 19 is slid back and forth. Similarly, viewing windows 50 and 51 are located on sheet 14 as shown in FIG. 2, so that rows of indicia 47a through 47f may be viewed. Use of these indicia, and the relationship of the indicia with the body 12 and sheet 19, will be discussed below.

At the other end of body 12, a plurality of superimposed angle gauges 52, 53, 54, 55 and 56 are mounted to the sheet 14 by means of a grommet 57. The grommet 57 acts as a pivot about which the gauges may be rotated for further use as described below. The relationship is also shown in the exploded view of FIG. 4. These gauges are made of material in flat sheet form, similar to the material of which sheets 13, 14 and 19 are made. The angle gauges 52, 53 and 54 are used to measure the external taper of male fittings, and are similar to each other in construction. Gauge 52, as shown for example in FIG. 6, has an end wall 58, two side walls 59 and 60 at right angles to wall 58, and a V-shaped opening 61 cut into the wall opposite end wall 58. The opening 61 is formed by the angled walls 62 and 63 which meet at apex 64 and define an angle of 37° with reference to the side wall. This gauge is designated "J.I.C. 37°".

The gauge 53 is similarly constructed, and is designated "S.A.E. 45°", and defines an angle of 45° with the side wall. The gauge 54 is similarly constructed, and is designated "J.I.S. Metric 30°", and defines an angle of 30° with the side wall.

The angle gauges 55 and 56 are used to measure the internal taper of female fittings, and are constructed similarly to each other, but are different in construction from the male gauges. As shown in FIG. 5, Gauge 55 has an end wall 65, side walls 66 and 67 at right angles thereto, and a generally rectangular opening 68 extending inwardly from the side opposite the end wall 65. The opening 68 is defined by an inner wall 69 parallel to end wall 65, and inner side walls 70 and 71 parallel to walls 66 and 67. The outer side walls 66 and 67 terminate in apexes 72 and 73. From the apex 72 on side wall 66 a first angle wall 74 is angled inwardly at an angle of 45°, terminating at the inner side wall 70. The first angle wall 74, and side walls 66 and 70 define a narrow strip 75. Similarly, from apex 73 on side wall 67, a second angle wall 76 is angled inwardly at an angle of 37°, terminating at inner side wall 71. The walls 67, 71 and 76 define a narrow strip 77.

The gauge 56 is identical in construction to gauge 55, except that the lower walls form angles of 30° and 24° instead of 45° and 37°.

It has been noted that each of the strips 75 and 77 of gauge 55 are different, and are marked "J.I.C. 37°" and "S.A.E. 45°". Similarly, the corresponding strips of gauge 56 are also different, and are marked "Metric 24°" and "Metric 30°".

On the front side of sheet 14, as shown in FIGS. 1 and 4, are six rows of notations which are aligned with the 6 rows of indicia 46a through 46f. These notations, reading top to bottom, are as follows:
FLANGE O.D.61
BOLT PATTERN 61
MALE PIPE O.D.
MALE J.I.C. AND O-RING BOSS
STECKO MALE
METRIC (mm.)

On the front side of sheet 13, as shown in FIG. 2, are also six rows of notations which are aligned with the 6 rows of indicia 47a through 47f. These notations, reading top to bottom, are as follows:
FLANGE O.D. 62
BOLT PATTERN 62
FEMALE PIPE I.D.
FEMALE J.I.C.
STECKO FEMALE
INCHES The meaning of these terms will be discussed below.

As is illustrated below, when using the device of the present invention, no complex conversions of measurements need to be made. No catalogs need to be searched. Industry standard dash number read-outs appear as a fitting is being measured. The device of the invention eliminates the need for expensive tools for measuring fittings such as hose adapters and flange head couplings.

OPERATION OF THE DEVICE

FIGS. 5 to 10 illustrate typical uses of the novel device.

Typically, in those applications where the fitting is of the type that is held in place by a number of bolts as is illustrated in FIG. 5, the only step required in determining the dash size of the fitting, and the kind of fitting that is used, is to measure the distance between the center of the bolts on the longest dimension of the bolt pattern. Since the bolt pattern is standardized, by measuring the distance between the center of bolts 100, it may be determined, by noting where the number appears in window 48 or 50, whether the fitting is an S.A.E. 61 standard fitting or an S.A.E. 62 high pressure fitting. For example, when the bolt pattern is measured and the number 12 appears in window 48, this denotes that an S.A.E. code 61 standard fitting, having a dash size of 12 is used.

Figure 11:
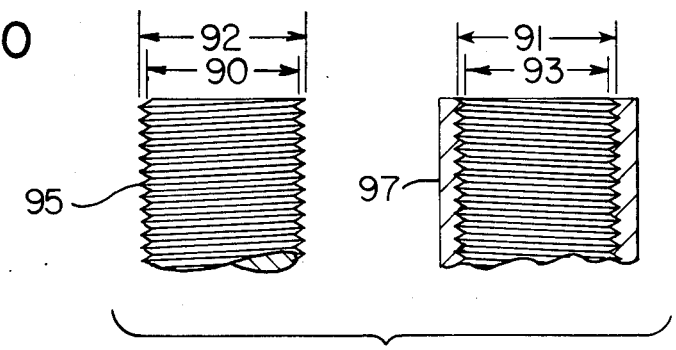
FIG. 11 illustrates the measurement known as standard "dash size".

A "dash size" is a standardized designation that refers to both male and female fittings. For example, a male fitting having a dash size of 12 is designed to fit a female fitting having a dash size 12. Although each unit in the dash size designates a specific unit of measurement, it will be recognized by those skilled in the art that a certain amount of "play" is required between the male fitting and the female fitting in order for it to be possible for the fittings to engage in use. Thus, the dash size does not designate the true diameter of either the male or the female fitting. The "dash size" is substantially the average of the O.D. of the male fitting and the I.D. of the female fitting. The principle is explained in more detail below with reference to threaded fittings as illustrated in FIG. 11.

Figure 6:
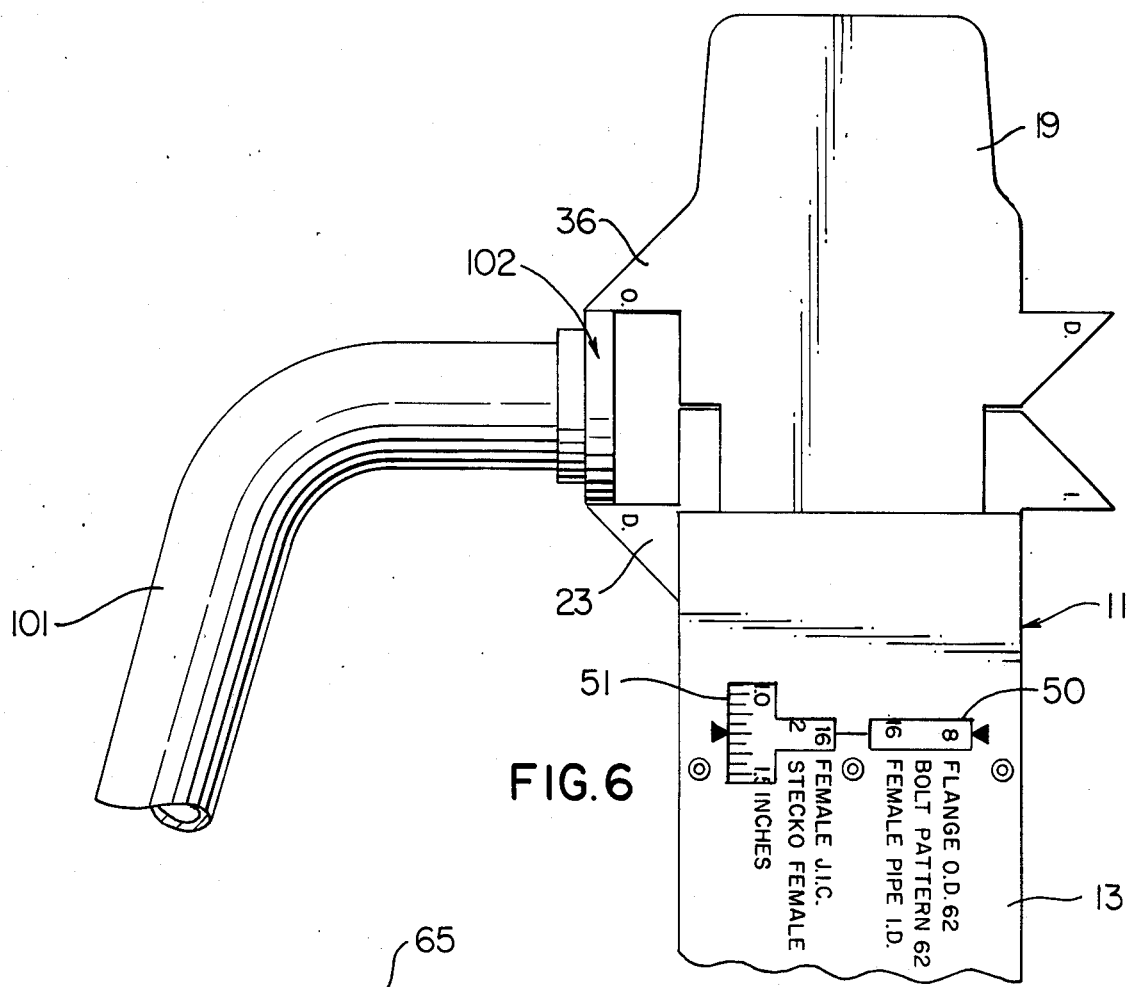
FIG. 6 illustrates a typical measurement of a flange.

In a similar manner, it can be determined whether a flange is a code 61 or code 62 fitting, and the dash size can be determined simply by measuring its O.D. Thus, as can be seen in FIG. 6, in the case where a flange 101 is measured at the O.D. 102, and an "8" appears in window 50, this indicates that the flange is a code 62 high pressure flange having a dash size of 8. It is standardized that the same dash size designation is given to most elements with which the flange is associated in use.

In similar manner, the dash sizes of "O" ring bosses, male and female pipe threads, and male and female Stecko fittings can be determined simply by measuring the fittings and reading the dash sizes in the appropriate window. For ease in gathering the appropriate parts of a fitting, the "O" rings and some other parts associated with each fitting are cataloged with reference to the dash sizes so that once the dash size of a fitting is known, all appropriate parts of the fitting can be found simply by cross-referencing the "dash" size of the fitting with the part number of the part needed.

Figure 7:
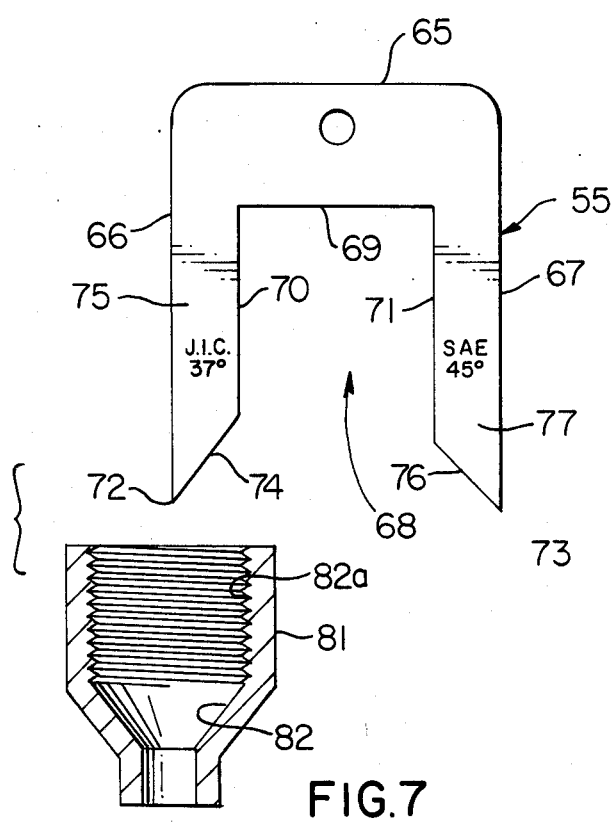
FIG. 7 is a view of one of the angle gauges illustrating a typical measurement of a female fitting.
Figure 8:
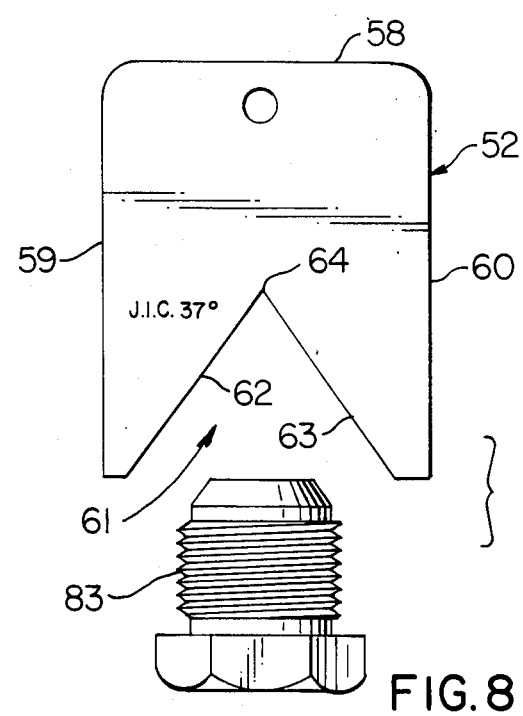
FIG. 8 is a view of another one of the angle gauges illustrating a typical measurement of a male fitting.

The first step in measuring a threaded fitting of the type illustrated in FIGS. 7 and 8 is to utilize one of the angle gauges 52 to 56 to determine the correct fitting angle. This will indicate the fitting type such as one of those referred to above (J.I.C. 37°, male or female; S.A.E. 45°, male or female; J.I.S. 30° metric, male; 24° metric female, or 30° metric female). In the example shown in FIG. 7, a fitting 81 is being checked for internal angle by inserting the side wall 66 of the gauge 65 into fitting 81, the wall 74 contacting the tapered wall 82, while wall 70 contacts threads 82a. This indicates a 37° J.I C. internal taper. In FIG. 8, a fitting 83 is checked by placing the walls 62 and 63 of gauge 58 against the tapered wall 84. This indicates a 37° J.I.C. external taper. Having determined that this is a J.I.C. 37° fitting in either instance, the next step is initiated.

Figure 9:
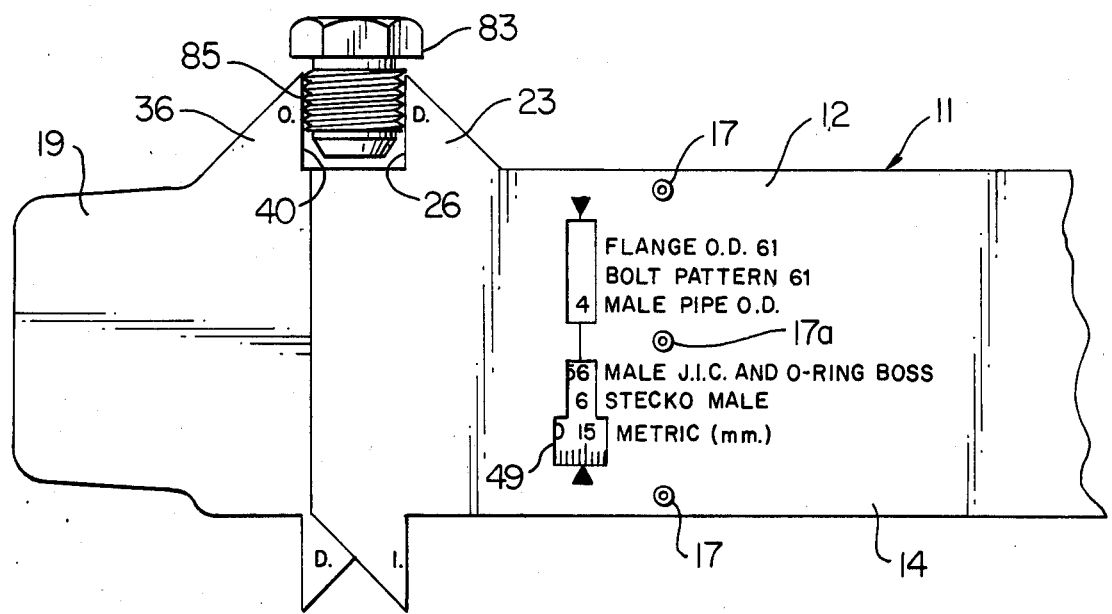
FIG. 9 is a view of a portion of the device illustrating a typical measurement of the outside diameter of a fitting and showing the corresponding indicia.
Figure 10:
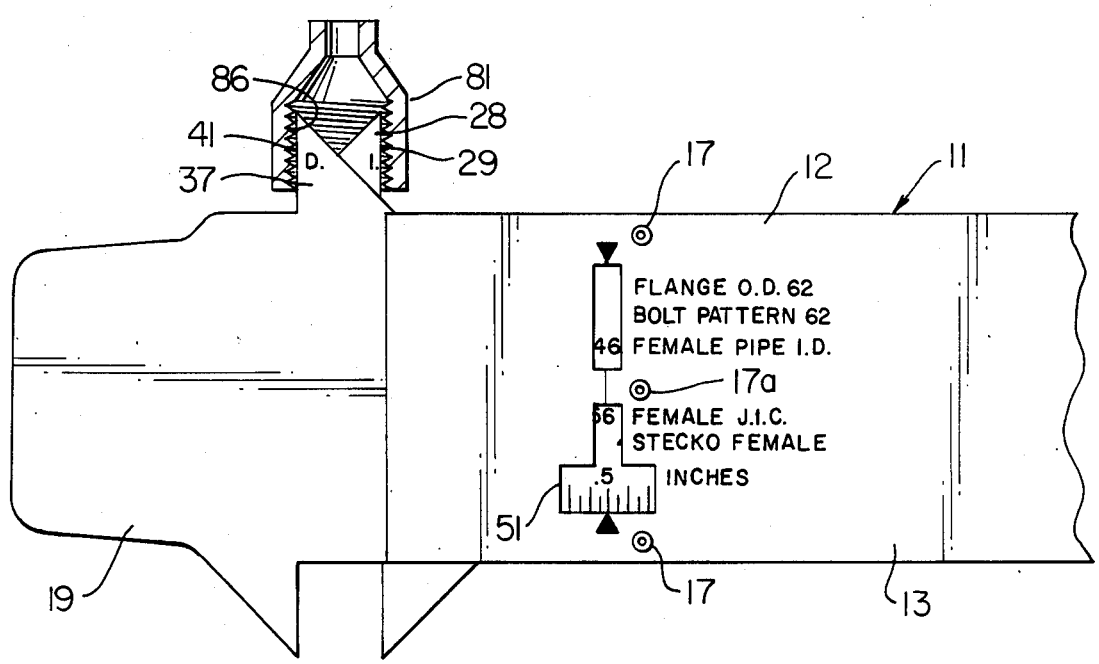
FIG. 10 is a view similar to FIG. 9 illustrating a typical inside diameter measurement.

This next step is illustrated in FIGS. 9 and 10. As illustrated in FIGS. 9 and 10, fittings 81 and 83 are to be checked for their dimension designated by a standard "dash size". As is illustrated in FIG. 11, the "dash" dimension in a threaded fitting is represented by reference number 90 on male fitting 95, whereas the outside diameter of the threads is represented by reference number 92. The "dash" dimension of female fitting 97 is represented by reference number 91, whereas the inside diameter of the threads is represented by reference number 93. If both the male and female fitting have a dash size of 12 in a J.I.C. fitting, for example, dimensions 90 and 91 will be approximately the same, whereas dimension 92 will be approximately 1-1/16" and dimension 93 will be approximately 15/16".

As can be seen in FIG. 9, when measuring a male fitting 83, the device 11 is held so that the sides 26 and 40 of triangular segments 23 and 36 will contact the outer surface of threads 85. This is done by sliding the sheet 19 toward the body 12, with the longer sheet 14 being used for the reading, since the O.D. is being read. Opposite the notation "MALE J.I.C. and 'O' RING BOSS", the number "6" is viewed in the lower window 49, so the fitting thus is a "dash 6" male J.I.C. fitting.

When the fitting 81 is to be checked for its dimension and dash size, the device is reversed as shown in FIG. 10. Again, the body 12 and movable sheet 19 are slid toward each other until the vertical sides 29 and 41 of triangular segments 28 and 37 are able to slide into the internal threaded wall 86 of the fitting 81. This time the readings are made through window 51 in the sheet 13. Opposite the notation "FEMALE J.I.C.", the number "6" appears in window 51, indicating a "dash 6" female J.I.C. fitting.

In addition to measuring the threads, flanges and bosses of the couplings, and bolt patterns, the triangular segments 23 and 26 may be used to measure the diameter of the hose itself by using the steps shown in FIG. 9 with respect to the hose, rather than a fitting.

While present exemplary embodiments of this invention, and methods of practicing the same have been illustrated and described, it will be recognized that this invention may be otherwise variously embodied and practiced within the scope of the following claims.

What is claimed is:

1. In a device for measuring features of a hose or fitting, the improvement comprising a flat body which includes at least two superimposed flat sheets having viewing means and means for separating said sheets therebetween secured together by fastening means, said sheets and said separting means forming a slot between said two sheets, one end of said body having a plurality of superimposed members, each member having a different configuration for measuring a tapered extremity to determine the type of said fitting, the other end of said body having a measuring means to measure a fitting or hose to determine the size thereof at least one portion of said measuring means being attached to one of said flat sheets, a third flat sheet slidably mounted between said two superimposed flat sheets and having at least one portion of said measuring means for cooperating with said portion on said one of said two flat sheets and having indicia correlated with the relationship between said dimensions determined by said measuring means and a plurality of standard industrial indentification systems whereby said hose or fitting is identified by an indicia on said third sheet in said viewing means.

2. The device of claim 1 in which said superimposed members are mounted on one of said fastening means, and said superimposed members are rotatable thereon.

3. The device of claim 1 in which said measured tapered extremity has an external taper, and at least one of said superimposed members is an angle gauge which is adapted to fit against at least two opposed sides of said external taper.

4. The device of claim 3 in which said angle gauge is a generally rectangular member having inwardly extending angled sides defining a recess which fits against at least two sides of said external taper.

5. The device of claim 1 in which said tapered extremity has an internal taper, and at least one of said superimposed members is an angle gauge which is adapted to fit within said internal taper.

6. The device of claim 5 in which said angle gauge includes at least one strip, the end of said strip extending inwardly at an angle, and said end is adapted to fit within said tapered extremity.

7. The device of claim 1 in which said third sheet has a laterally extending slot, and one of said fastening means is inserted through said slot to provide stability and to limit the extent of the slidability of said third sheet.

8. The device of claim 1 wherein said measuring means further comprises at least two opposed members, at least one of said members being attached to at least one of said two flat sheets and said other member being attached to said third flat sheet, said opposed members providing reference points between said third flat sheet and said one of said two flat sheets when said device used to measure the size of said hose or fitting.

9. The device of claim 8 in which said opposed members each comprise generally triangular members having one side parallel to one side of said opposed member, said parallel sides providing said reference points for measuring said fitting.

10. The device of claim 8 in which said opposed members provide outside diameter measurement.

11. The device of claim 8 in which said opposed members provide inside diameter measurement.

12. The device of claim 8 further comprising a pair of opposed members on said body and a pair of opposed members on said separate flat sheet, one set of said opposed members providing outside diameter measurements and another set of said opposed members providing inside diameter measurements.

13. A single device for measuring features of a hose fitting comprising:
    a flat body having viewing means therein;
    a plurality of first measuring means operatively connected to said body for measuring the external taper of male fittings and internal taper of female fittings to indicate the type thereof;
    a plurality of second measuring means operatively connected to said body for respectively determining the size of a male fitting and a female fitting;
    movable means, operatively connected to said second measuring means and being viewable at said viewing means, for translating the measured type and size of said hose fitting into standard nomenclature so as to identify the specific part by standard industrial nomenclature.

14. A device for readily identifying standard fittings and hose members in a fluid transmission system comprising:
    at least two flat sumperimposed sheets separated by at least two flat thin strips made of similar material, at least one end of one of said two sheets having at least one triangular segment extending from each side, each of said sheets having at least one viewing window;
    grommets for securing said sheets and strips together into a body thereby creating an opening between said two sheets; and
    a third narrow flat sheet slidably mounted between said two sheets in said opening and having a horizontal slot for fitting about one of said grommets thereby preventing said third sheet from being separated from said two sheets, said third sheet having at least one triangular segment extending from each side thereof for cooperating with said corresponding segments of said one of said two sheets for measuring the dimensions of said fitting and hose member and having at least three vertically placed rows of indicia both above and below said slot on both sides thereof, said indicia being means for converting measurements taken with said cooperating triangular segments into standard references corresponding to specific types of fittings and hoses and being coordinated with said viewing windows whereby said indicia can be viewed therethrough.

15. The device of claim 14 further comprising:
a plurality of superimposed angle gauges for measuring the external taper of male fitting and for measuring the internal taper of female fitting operatively attached to the end of said body opposite said cooperating triangular segments.

16. A method of determining the diameter, type of thread and flange in either the metric of English system of a fitting or hose utilizing a measuring device comprising the steps of:
  selecting one of a plurality of angle gauges in order to determine the correct fitting angle;
  placing said angle gauge on said fitting to determine if the gauge selected mates with said angle;
  if correct, placing a means for measuring in position on said fitting or hose to be measured, said means having correlated indicia to determine the standard size of said fitting or hose; and
  reading the standard size from a viewing window located on the side of said device from said indicia corresponding to the correct one of said gauges thereby obtaining all necessary information to definitively identify said fitting or hose.

* * * * *